US005180218A

United States Patent [19]

Ohshio

[11] Patent Number: 5,180,218

[45] Date of Patent: Jan. 19, 1993

[54] AUTOMOTIVE PROJECTION TYPE HEADLAMP HAVING NO ULTRAVIOLET RAYS OUTPUT

[75] Inventor: Hirohiko Ohshio, Shizuoka, Japan

[73] Assignee: Koito Manufacturing Co., Ltd., Tokyo, Japan

[21] Appl. No.: 850,824

[22] Filed: Mar. 13, 1992

[30] Foreign Application Priority Data

Mar. 19, 1991 [JP] Japan .................................. 3-54596

[51] Int. Cl.[5] .............................................. B60Q 1/00

[52] U.S. Cl. ...................................... 362/61; 362/293

[58] Field of Search ................................ 362/293, 61

[56] References Cited

U.S. PATENT DOCUMENTS

| | | | |
|---|---|---|---|
| 5,130,904 | 7/1992 | Ohshio et al. | 362/61 |
| 5,132,881 | 7/1992 | Wakimizu et al. | 362/61 |

*Primary Examiner*—Allen M. Ostrager

*Attorney, Agent, or Firm*—Sughrue, Mion, Zinn, Macpeak & Seas

[57] ABSTRACT

A projection-type automotive headlamp which includes a lamp body, an outer cover defining a lamp chamber with the lamp body, a projection unit consisting of a substantially elliptic reflector on which a discharge-type bulb is mounted and a projection lens secured on a front opening of the reflector which are unitary formed with each other, a cylindrical UV rays shielding glove surrounding the discharge-type bulb, and a UV rays shielding layer formed on the projection lens.

24 Claims, 3 Drawing Sheets

AUTOMOTIVE PROJECTION TYPE HEADLAMP HAVING NO ULTRAVIOLET RAYS OUTPUT

BACKGROUND OF THE INVENTION

The present invention relates to a projection type automotive headlamp in which light beams from a light source is reflected by a reflector and radiated in parallel beam by passing through a projection lens and more particularly to an automotive headlamp in which a discharge-type bulb is employed as a light source.

Recently, projection type headlamps have remarkably been employed since it is compact is size and it can obtain extremely bright light distribution pattern as compared to the conventional reflection-type headlamp. Further, discharge-type bulbs having been employed in automotive lamps in view of their good luminous efficiency and desirable color spectrum, as well as their long service life.

However, a discharge bulb produces a large quantity of ultraviolet (UV) rays together with visual light rays from the discharge which takes place in the gases (mercury gas, iodide gas and xenon gas) contained in the discharge chamber of the lamp. Ultraviolet rays are believed capable of destroying protein molecules and further believed a cause of skin cancer. Furthermore, ultraviolet rays destroy resin materials. Thus, there has been a problem that the light output of the discharge bulb includes health-damaging ultraviolet rays so that it is undesirable to be subjected to illumination for long periods from such a lamp. Also, resin members in the vicinity of the discharge bulb tend to deteriorate rapidly.

SUMMARY OF THE INVENTION

The present invention has been attained in view of the above problems in the conventional art, and an object of the invention is to provide an automotive headlamp employing a discharge-type bulb capable of completely cutting off ultraviolet (UV) rays generating from the discharge bulb light source.

Another object of the present invention is to provide an automotive headlamp employing a discharge-type bulb capable of cutting off the UV rays completely by a plurality of UV rays shielding layers.

The above and other objects can be achieved by a provision of a projection-type automotive headlamp which, according to the present invention, includes a lamp body, an outer cover secured to the body for defining a lamp chamber with the lamp body, a projection unit consisting of a substantially elliptic reflector on which a discharge-type bulb is mounted, a holder fixedly connected to the reflector and a projection lens secured on a front opening of the holder which are unitary formed with one another, a cylindrical UV rays shielding glove surrounding the discharge-type bulb, and a UV rays shielding layer formed on the projection lens.

According to the present invention, UV rays part of the light rays radiating from the discharge bulb and directing to the reflector is once cut off by the UV rays shielding glove, and twice cut off by the UV rays shielding layer coated on the projection lens when passing therethrough. On the other hand, UV part of the light rays radiating from the discharge bulb and directing directly to the projection lens is also cut off by the UV rays shielding layer coated on the lens.

DESCRIPTION OF THE PREFERRED EMBODIMENTS

Preferred embodiments of the present invention will now be described with reference to accompanying drawings.

Figure 1:
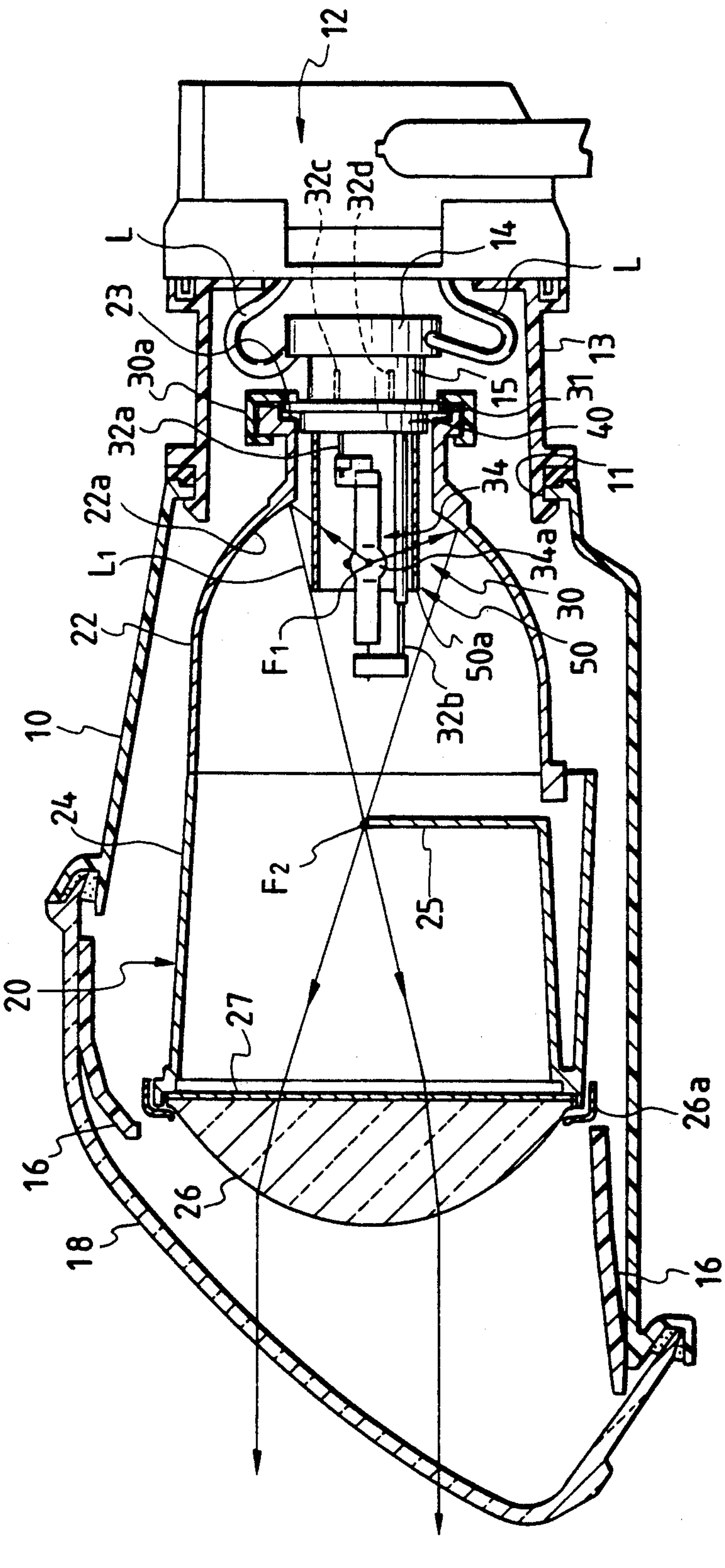
FIG. 1 is a sectional view showing a projection type automotive headlamp employing a discharge-type bulb as a light source according to a first embodiment of the invention.
Figure 2:
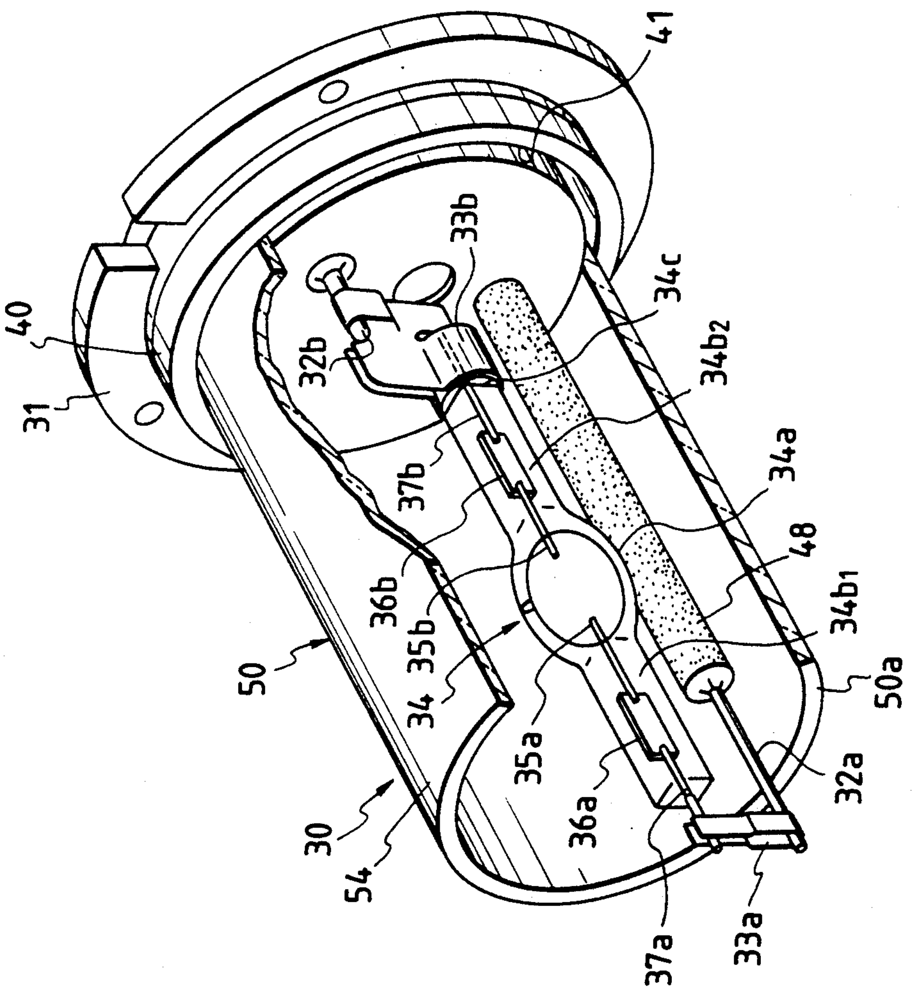
FIG. 2 is an enlarged perspective view of the discharge-type bulb shown in FIG. 1.

FIG. 1 is a sectional view showing a projection type automotive headlamp employing a discharge-type bulb as a light source according to a first embodiment of the invention. FIG. 2 is an enlarged perspective view of the discharge-type bulb shown in FIG. 1.

A projector unit 20 is accommodated in a lamp chamber defined by a lamp body 10 and an outer cover so that the unit is tiltably supported therein by an aiming mechanism (not shown). The projector unit 20 consists of a substantially ellipsoidal reflector 22 formed of metal, a discharge-type bulb 30 mounted in a bulb mounting hole 23 formed at a rear end portion of the reflector 22, a metal lens holder 24 fixed to a front opening of the reflector 22 and a projection lens 26 secured to a front opening of the holder 24, which are unitary connected to one another. The discharge-type bulb 30 is secured into the bulb mounting hole 23 by a locking cap **30*a* whereas the projection lens 26 is caulked to the lens holder 24 by an annular lens fixing frame 26*a*. Ultraviolet ray (UV) shielding layer 27 is coated on a rear surface of the projection lens 26. The light rays radiating from the discharge-type bulb 30 pass through the UV shielding layer 27** so that undesired health damaging ultraviolet rays are cut off by the film.

The discharge-type bulb 30 is provided with a discharge member 34 supported by a pair of lead supports **32*a*, 32*b* protruding from a front surface of an insulating base 31 so that a discharging part (glass ball) 34*a* is positioned on a first focal point $F_1$ of the reflector 22. A cylindrical glove 50 performing to shield the UV rays is fixed to a front portion of the base 31 through an insulating disc 40 so that the glove 50 surrounds the discharge member 34. The light rays radiating from the discharge member 34 passes through the glove 50 by which the undesired ultraviolet rays are cut off. A shade 25 for forming a required light distribution pattern is unitary formed on the lens holder 24 and disposed around a second focal point $F_2$ of the reflector 22. Accordingly, the light beams from the discharging part 34*a* are focused around the second focal point $F_2$ by the reflector 22 and then pass through the projection lens 26** to be parallel light beams. The sub-beam of the automobile is thus formed.

The most light rays radiating from the discharging part **34*a* of the discharge member and directing toward the reflector 22 pass through the glove 50 surrounding the discharge member 34 so that the UV rays contained in the light rays are once cut off. Further, the light rays passing through the glove 50 and reflected by the reflector 22 pass through the projection lens 26** so that the UV rays are twice cut off by the UV rays shielding layer 27 coated on the rear surface of the lens 26. On the other hand, part of the light rays radiating from the discharging part 34*a* orients directly toward the projection lens through a front opening of the cylindrical glove 50 without passing through the glove. However, the health damaging UV rays contained in the direct light rays are effectively cut off by the UV rays shielding layer 27 when passing through the projection lens 26. Therefore, the UV rays contained in the most of light rays which are reflected by the reflector 22 and large part of the light beams of the automobile are twice cut off by the two UV shielding members. Hence, the light rays after passing through the projection lens 26 do not cause a problem that the rays affect human bodies and deteriorate and destroy resin materials.

A circuit housing unit 12 accommodates therein a circuit for driving the discharge-type bulb and unitary connects to an opening portion 11 formed on the rear end part of the lamp body 10 through a cylindrical extending portion 13. A female connector 14 connecting to a lead wire L extending from the driving circuit connects to a male connector 15 unitary formed on a rear surface of the insulating base 31. An ornamental plate 16 formed of synthetic resin material is disposed inside the projection unit 20 around the projection lens 26. A material having silver color is coated on a surface of the ornamental plate 16 for causing the headlamp to have a good appearance during the lighting-off condition. An outer cover 18 is unitary mounted on a front opening of the lamp body 10 and defines a headlamp chamber with the lamp body 10.

As shown in FIG. 2, the discharge member 34 consists of an oval shield glass ball (discharging part) 34*a* and a pair of pinch seal parts $34b_1$, $34b_2$ which are rectangular in cross section and formed at both sides of the glass ball 34*a*. The glass ball 34*a* and pinch seal parts $34b_1$ and $34b_2$ are formed by pinching a glass tube at both ends thereof. Inert gas for firing, mercury and metal halide are sealed in the glass ball 34*a*. One end of the discharge member 34 is provided with a cylindrical extending portion 34*c* unitary formed with and disposed adjacent to the rectangular pinch seal part $34b_2$. The extending portion 34*c* is not pinch-sealed and supported by a metal support member 33*b*. A pair of discharge electrodes 35*a*, 35*b* formed of tungsten protrude inward the discharge chamber (inside the glass ball 34*a*) to face each other. The discharge electrodes 35*a* and 35*b* connect to lead wires 37*a* and 37*b* through molybdenum foil 36*a* and 36*b* embedded in the pinch seal portions $34b_1$ and $34b_2$, respectively. The lead wire 37*b* passes through the extending portion 34*c* and spot welded to the metal support member 33*b*.

Further, the discharge member 34 is also supported at both end thereof by a pair of long and short lead supports 32*a* and 32*b* insertion molded on the insulating base 31 and protruding towards the front side of the base, through the metal supports 33*a* and 33*b*, respectively. The insulating base 31 is formed of synthetic resin such as PPS, for example and molded to be a disc shape. Male connector terminals 32*c* and 32*d* welded to the lead support 32*a* and 32*b*, respectively, protrude from the rear side of the insulating base 31. A ceramic disc 40 is unitary mounted on a front side of the base 31 through which the lead supports 32*a* and 32*b* penetrate. The lead support 32*a* is surrounded by an insulating cylindrical member 48 made of ceramic for preventing an undesired discharge.

The transparent cylindrical glove 50 having a front opening is fixedly adhered in a groove engaging groove 41 formed on the ceramic disc 40. A UV rays shielding layer 54 formed of ZnO or the like is coated on an outer surface of the cylindrical grass of the glove 50 so that the UV rays contained in the light beams passing through the glove 50 are cut off to thereby allow merely visible light rays after cutting off the UV rays to go toward the reflector 22. It is known that the wavelength range of UV ray which actually affects a human body is substantially equal to or less than 370 nm. In order to effectively cut off the wavelength below the 370 nm the thickness of the UV shielding layer 54 must be equal to or larger than 1.6 μm. On the other hand, in order to prevent the film 54 from peeling off the glove 50 the thickness of the film should be equal to or less than 5 μm. Since the ability of the shielding layer for cutting the UV rays off may vary in accordance with temperature around the glove 50, an actual thickness of the film 54 should cut off the wavelength of at least equal to or less than 370–380 nm.

The UV rays shielding layer may be formed by dip molding, depositing treatment, spraying or other methods. In case of the dip molding, the thickness of the film can be controlled by changing speed of lifting up the glove from a liquid bath or by varying the number of times of the dipping operation. In case of the other film forming treatment, of course, the thickness of the film can be adjusted by the number of times of depositing or spraying. The UV rays shielding layer 27 may be formed by the same process or operation as that for the shielding layer 54 of the glove 50.

The UV rays shielding layers 27 and 54 may be formed, other than ZnO as described above, of single chemical compound such as $TiO_2$, CaO or $Fe_2O_3$, or dielectric multi-layer film formed by accumulating films of, for example, $TiO_2$, $SiO_2$, MgF or $Fe_2O_5$. These methods of forming the UV rays shielding layer are disclosed in Japanese patent application No. Hei. 2-100502.

A tip end 50*a* of the glove 50 is so positioned that the glove does not shut off a reflected light $L_1$ reflected by a specific reflecting surface 22*a* disposed around the bulb mounting hole 23 for forming a hot zone of the distributed light pattern. In other words, an longitudinal length of the glove 50 is predetermined not to shut off the reflected light $L_1$ which influences the hot zone.

According to the first embodiment described above, the UV rays shielding layer is formed on the outer surface of the cylindrical glass of the glove. However, the film may be coated on an inner surface or otherwise both inner and outer surfaces of the cylindrical glass. Further, the cylindrical glass itself may be made of a material capable of shielding UV rays without coating any UV rays shielding layer thereon. In this case, the glove may be formed of borosilicate glass material containing selenium or cerium.

Furthermore, although the glove 50 is fixedly mounted onto the insulating base 31 to be unitary with the discharge bulb 31 according to the first embodiment, the glove 50 may separately be provided and a base end of the glove may be fixedly engaged with the bulb mounting hole 23 of the reflector 22.

Figure 3:
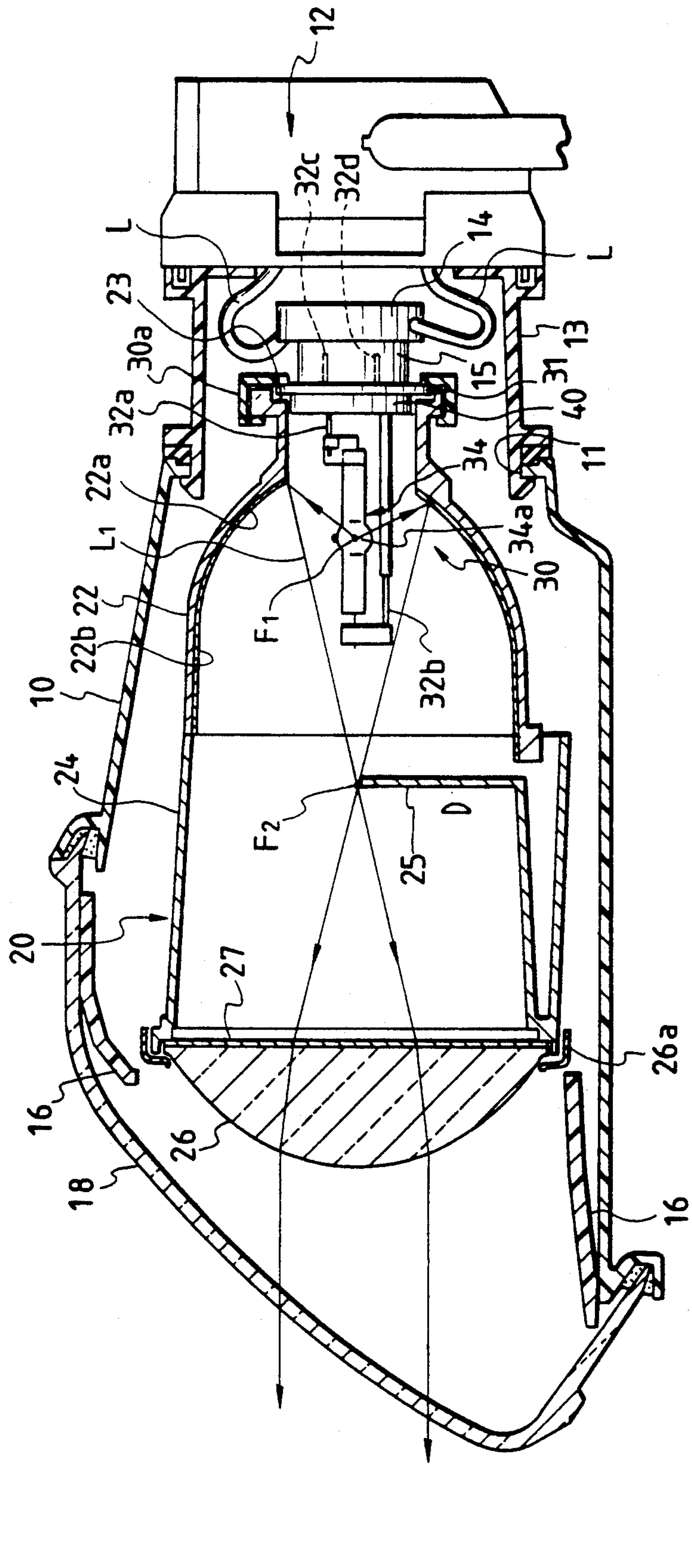
FIG. 3 is a cross sectional view showing a projection-type automotive headlamp according to a second embodiment of the invention.

FIG. 3 is a cross sectional view showing a projection-type automotive headlamp according to the second embodiment of the invention.

According to the second embodiment, a UV rays shielding layer 22*b* is formed on an inner surface of the reflector 22 instead of the glove 50 forming thereon the shielding layer in the first embodiment. Since the other components and structure of the second embodiment are the same as that of the first embodiment, like parts and components are designated by the same reference numerals and the detail description is omitted.

According to the second embodiment, UV part of the light rays radiating from the discharging part 34*a* and directing to the reflector 22 is once cut off by the UV rays shielding layer 22*b* coated on the reflector 22, and twice cut off by the UV rays shielding layer 27 coated on the projection lens 26 when passing therethrough. On the other hand, UV part of the light rays radiating from the discharging part 34*a* and directing directly to the projection lens 26 is also cut off the UV rays shielding layer 27 coated on the lens 26.

The UV rays shielding layer 22*b* of the second embodiment may also be applied to the first embodiment to cut off the undesired UV rays more completely.

Moreover, the UV rays shielding layer 27 is coated on the rear surface of the projection lens 26 according to the foregoing first and second embodiments. However, the film 27 may be formed on a front surface or otherwise both front and rear surfaces of the projection lens 26.

The outer cover 18 may be provided with lens steps on a surface thereof for partially diffusing light beams if desired or necessary.

As described above, according to the present invention, the UV rays radiating from the discharge bulb are effectively cut off by a plurality of UV rays shielding layers. Accordingly, since the health damaging UV rays which cause a problem are effectively and completely cut off, the projectiontype headlamp of the invention can obtain a safety for human bodies and would not deteriorate or destroy the synthetic resin material used in the headlamp.

What is claimed is:

1. An automotive projection-type headlamp comprising:
   - a headlamp body;
   - an outer cover mounted on said headlamp body for defining a lamp chamber; and
   - a projector unit accommodated in said lamp chamber, said projection unit comprising:
     - a substantially elliptic reflector having a front opening;
     - a cylindrical holder fixed to said front opening of said reflector;
     - a projection lens secured to said holder;
     - a light source comprising a discharge-type bulb located at a first focal point of said reflector;
     - first ultraviolet (UV) shielding means for cutting off UV rays part of light beams radiating from said discharge bulb and directing toward said reflector; and
     - second UV shielding means for cutting off UV rays part of light beams passing through said projection lens.

2. The automotive projection-type headlamp of claim 1, further comprising a cylindrical glove surrounding said discharge bulb, a length of said glove is predetermined not to shut off the light beams radiating from said discharge bulb and directing to a hot zone portion of said reflector.

3. The automotive projection-type headlamp of claim 2, wherein said first UV shielding means comprises a first UV shielding layer formed on said glove.

4. The automotive projection-type headlamp of claim 3, wherein said first UV shielding layer is coated on an inner surface of said glove.

5. The automotive projection-type headlamp of claim 3, wherein said first UV shielding layer is coated on an outer surface of said glove.

6. The automotive projection-type headlamp of claim 3, wherein said first UV shielding layer is coated both on an inner and outer surfaces of said glove.

7. The automotive projection-type headlamp of claim 2, wherein said first UV shielding means comprises said glove formed of a glass containing material capable of cutting off UV rays.

8. The automotive projection-type headlamp of claim 1, wherein said first UV shielding means comprises a first UV shielding layer coated on said reflector.

9. The automotive projection-type headlamp of claim 1, wherein said second UV shielding means comprises a second UV shielding layer formed on said projection lens.

10. The automotive projection-type headlamp of claim 9, wherein said second UV shielding layer is coated on an inner surface of said projection lens.

11. The automotive projection-type headlamp of claim 9, wherein said second UV shielding layer is coated on an outer surface of said projection lens.

12. The automotive projection-type headlamp of claim 9, wherein said second UV shielding layer is coated both on an inner and outer surfaces of said projection lens.

13. The automotive projection-type headlamp of claim 1, wherein said first and second UV shielding means comprises a film formed by a dip molding.

14. The automotive projection-type headlamp of claim 1, wherein said first and second UV shielding means comprises a film formed by a deposition process.

15. The automotive projection-type headlamp of claim 1, wherein said first and second UV shielding means comprises a film formed by a spraying operation.

16. The automotive projection-type headlamp of claim 1, wherein said first and second UV shielding means comprises a film formed of a material selected from the single chemical compound group consisting of ZnO, $TiO_2$, CaO and $Fe_2O_3$.

17. The automotive projection-type headlamp of claim 1, wherein said first and second UV shielding means comprises a dielectric multi-layer film formed of a material selected from the group consisting of ZnO, $TiO_2$, $SiO_2$, MgF and $Fe_2O_5$.

18. The automotive projection-type headlamp of claim 1, wherein said first and second UV shielding means comprises a film a thickness of which is defined within a range between 1.6 μm and 5 μm.

19. The automotive projection-type headlamp of claim 2, wherein said glove is fixed to an insulating base secured to said reflector through an insulating disc so that said glove is unitary formed with said discharge bulb.

20. The automotive projection-type headlamp of claim 2, wherein said glove is mounted directly on said reflector.

21. The automotive projection-type headlamp of claim 3, further comprising third UV shielding means.

22. The automotive projection-type headlamp of claim 21, wherein said third UV shielding means comprises a third UV shielding layer coated on said reflector.

23. The automotive projection-type headlamp of claim 1, wherein said outer cover comprises lens steps for partially difussing the light beams.

24. The automotive projection-type headlamp of claim 7, wherein said glove is formed of borosilicate glass material containing selenium or cerium.

* * * * *